(12) United States Patent  
Banatwala et al.

(10) Patent No.: US 9,697,208 B2  
(45) Date of Patent: *Jul. 4, 2017

(54) IDENTIFYING CONTENT UNDER ACCESS CONTROL

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/279,978

(22) Filed: Sep. 29, 2016

(65) Prior Publication Data

US 2017/0011132 A1 Jan. 12, 2017

Related U.S. Application Data

(63) Continuation of application No. 15/083,360, filed on Mar. 29, 2016, now Pat. No. 9,547,649, which is a (Continued)

(51) Int. Cl.
*G06F 17/30* (2006.01)
*G06F 21/00* (2013.01)
(Continued)

(52) U.S. Cl.
CPC .. *G06F 17/30035* (2013.01); *G06F 17/30289* (2013.01); *G06F 17/30528* (2013.01);
(Continued)

(58) Field of Classification Search
CPC ............... G06F 17/30867; G06F 17/30991
See application file for complete search history.

(56) References Cited

U.S. PATENT DOCUMENTS 7,756,843 B1 7/2010 Palmer
8,078,624 B2 12/2011 Daya
(Continued)

FOREIGN PATENT DOCUMENTS

EP 1975864 A1 1/2008

OTHER PUBLICATIONS

Anonymous, "System and method for sorting enterprise social communities based on user enterprise organization chain and social activities," IP.com No. IPCOM000209496D, IP.com Electronic Publication Aug. 8, 2011, 8 pages.
(Continued)

*Primary Examiner* — Khanh Pham
(74) *Attorney, Agent, or Firm* — Scott S. Dobson

(57) ABSTRACT

A search query is received from a first user through one or more input devices. A set of results is determined from content stored on a computer system based on the search query. The set of results includes a first subset of results not accessible to the first user due to access control. A list of results is provided to the first user. The list excludes the first subset of results. A target result is identified from the first subset of results. An owner is identified with control over access to the target result. The owner is notified that the target result is not accessible to at least one user.

1 Claim, 3 Drawing Sheets

Related U.S. Application Data continuation of application No. 14/315,411, filed on Jun. 26, 2014.

(51) Int. Cl.
*G06F 21/60* (2013.01)
*G06F 21/62* (2013.01)
*G06Q 50/00* (2012.01)

(52) U.S. Cl.
CPC .. *G06F 17/30554* (2013.01); *G06F 17/30864* (2013.01); *G06F 17/30867* (2013.01); *G06F 17/30991* (2013.01); *G06F 21/00* (2013.01); *G06F 21/604* (2013.01); *G06F 21/6245* (2013.01); *G06Q 50/01* (2013.01)

(56) References Cited

U.S. PATENT DOCUMENTS

| | | | |
|---|---|---|---|
| 8,234,258 B2 | 7/2012 | Palmer | |
| 8,332,430 B2 | 12/2012 | Koide et al. | |
| 9,020,913 B2 | 4/2015 | Rajamani et al. | |
| 9,317,563 B1* | 4/2016 | Horling | G06F 17/3053 |
| 9,396,347 B2* | 7/2016 | Duke | G06F 21/6209 |
| 2004/0054663 A1 | 3/2004 | Goodwin | |
| 2007/0005595 A1 | 1/2007 | Gafter | |
| 2007/0162417 A1 | 7/2007 | Cozianu et al. | |
| 2008/0033954 A1 | 2/2008 | Brooks et al. | |
| 2009/0112868 A1 | 4/2009 | Rajamani et al. | |
| 2010/0262624 A1* | 10/2010 | Pullikottil | G06F 17/30336 707/783 |
| 2011/0197255 A1 | 8/2011 | DiCrescenzo et al. | |
| 2013/0263221 A1 | 10/2013 | Faitelson et al. | |
| 2015/0379031 A1 | 12/2015 | Banatwala et al. | |
| 2016/0196263 A1 | 7/2016 | Banatwala et al. | |
| 2017/0011230 A1 | 1/2017 | Banatwala et al. | |

OTHER PUBLICATIONS

IBM, "Method for Notifying the Owner of a Locked Resource Who is Requesting Access to the Resource," IP.com No. IPCOM000154371D, IP.com Electronic Publication Jun. 28, 2007, 3 pages.

List of IBM Patents or Patent Applications Treated as Related, dated Feb. 8, 2017, pp. 1-2.

* cited by examiner

IDENTIFYING CONTENT UNDER ACCESS CONTROL

BACKGROUND

The present disclosure relates to content under access control in computer systems, and more specifically, to identifying content under access control in a computer system.

Content in computer systems can be made accessible to some users and inaccessible to other users using access control. In some computer systems, content created by an owner is only accessible, by default, to a certain group associated with the owner. However, the owner of the content may be able to modify the access control to the content.

SUMMARY

According to embodiments of the present disclosure, a method for identifying content under access control is disclosed. The method includes receiving a search query from a first user through one or more input devices. The method further includes determining a set of results from content stored on a computer system based on the search query. The set of results includes a first subset of results not accessible to the first user due to access control. The method further includes providing a list of results to the first user. The list excludes the first subset of results. The method further includes identifying a target result from the first subset of results. The method further includes identifying an owner with control over access to the target result and notifying the owner that the target result is not accessible to at least one user.

Further disclosed herein are embodiments of a computer program product for identifying content under access control. The computer program product includes a computer readable storage medium having program code embodied therewith. The program code is executable by a computer to perform a method. The method includes receiving a search query from a first user through one or more input devices. The method further includes determining a set of results from content stored on a computer system based on the search query. The set of results includes a first subset of results not accessible to the first user due to access control. The method further includes providing a list of results to the first user. The list excludes the first subset of results. The method further includes identifying a target result from the first subset of results. The method further includes identifying an owner with control over access to the target result and notifying the owner that the target result is not accessible to at least one user.

Further disclosed herein are embodiments of a system for identifying content under access control. The system includes one or more processors, one or more computer-readable memories, one or more computer-readable tangible storage devices, and program instructions stored on at least one of the one or more storage devices for execution by at least one of the one or more processors via at least one of the one or more memories. The program instructions include program instructions to receive a search query from a first user through one or more input devices. The program instructions further include program instructions to determine a set of results from content stored on a computer system based on the search query. The set of results includes a first subset of results not accessible to the first user due to access control. The program instructions further include program instructions to provide a list of results to the first user. The list excludes the first subset of results. The program instructions further include program instructions to identify a target result from the first subset of results. The program instructions further include program instructions to identify an owner with control over access to the target result and program instructions to notify the owner that the target result is not accessible to at least one user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
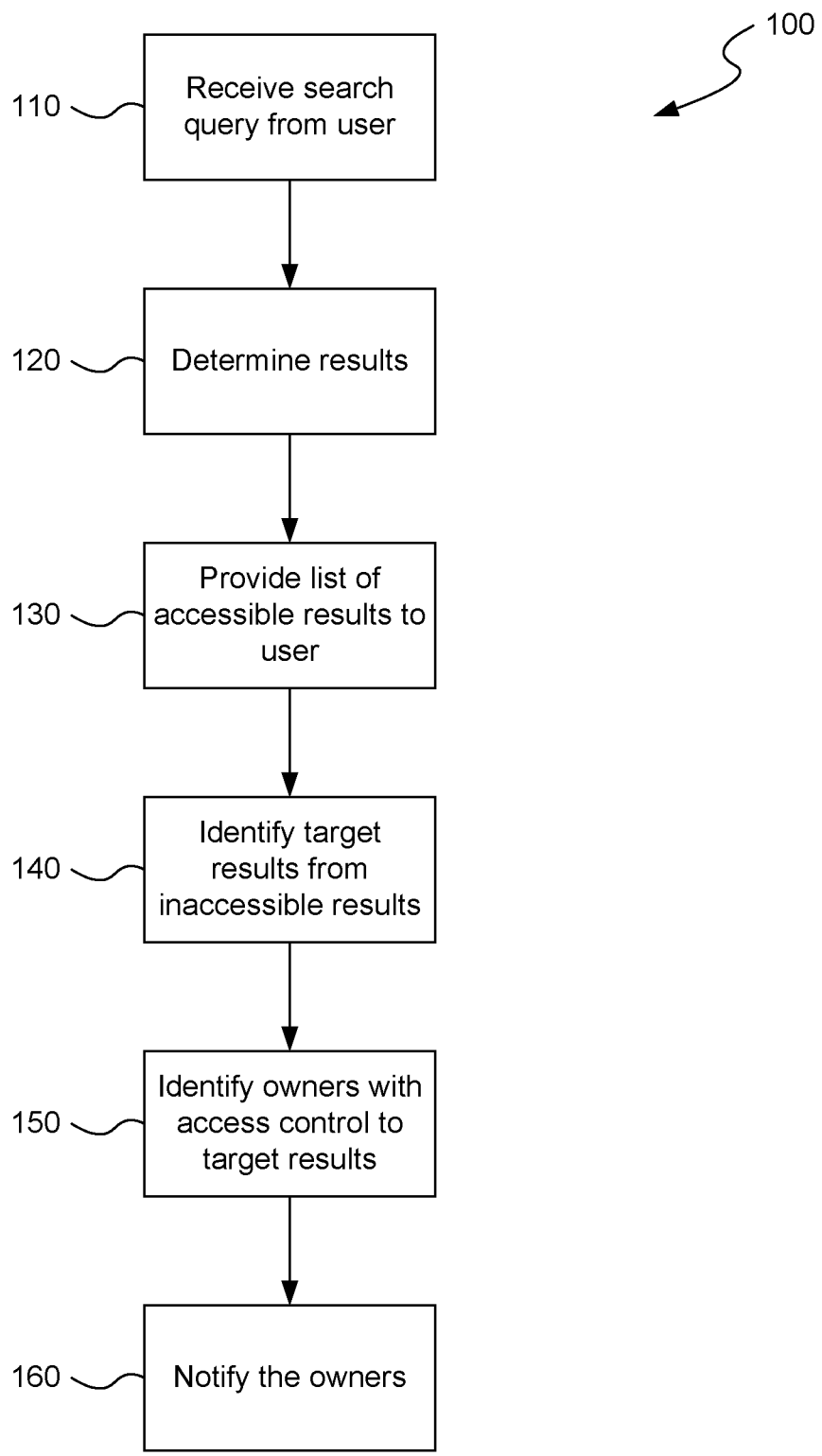
FIG. 1 depicts a flow diagram of an example method for identifying content under access control in a computer system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying content under access control in a computer system. More particular aspects relate to notifying owners of content under access control that their content was produced in a search by a user without access. While the present disclosure is not necessarily limited to such applications, various aspects of the disclosure may be appreciated through a discussion of various examples using this context.

Embodiments of the present invention may allow for notification of owners of content under access control when a user without access to the content executes a search which produces the content. Additionally, the security of the content may be preserved by not disclosing the content in the list of results to the user performing the search. This may allow the owner of content to preserve security of their content while also allowing the owner to review the access control on content which may be useful to users without access to the content.

A user may enter a search query to search for content stored on a computer system. The content may include documents, spreadsheets, images, video, or any other content stored on a computer system which may appear in a search executed by users of the computer system. The system may use a search engine to determine results based on the search query which include results not accessible to the user because of access control on the results. The computing device may display a list of results to the user which excludes the inaccessible results. Target results may be identified from the inaccessible results. Owners with permission to modify the access control of the target results may be identified and notified. The owners may review the access control on the target results and determine whether to make the target results available to more users.

Identifying results inaccessible to the user may be accomplished in several ways and may depend on how the search engine performs searches by users of the computer system. For example, the search engine may search content stored on the computer system which includes inaccessible content to produce initial results that include results which the user does not have access to. The initial results may be filtered to provide the user with a list containing only results which the user has access to. Results which are inaccessible to the user may be determined by comparing the initial results to the filtered results or by identifying the inaccessible results during the filtering process. In some embodiments, the search engine may search only content accessible to the user performing the search. A second search may be performed on additional content stored on the system which includes content inaccessible to the user. The second search may be performed, for example, using a superuser account with access to all of the content stored on the system. The results of the second search may be compared with the results of the user's search to identify results which are inaccessible to the user.

Target results may be identified from the inaccessible results in several ways. In some embodiments, the target results are simply all of the identified inaccessible results. In some embodiments, relevance scores for results or previous search data may be used to determine target results.

Search engines typically will produce relevance scores for each result to indicate how relevant the result is to the search query. Results with low relevance scores may be ignored in identifying target results. For example, a result may be ignored in identifying a target result if the relevance value produced by the search engine does not exceed a specified minimum relevance value. This may reduce the chance of notifying an owner of a result which is not useful to the user performing the search.

Search information may be stored for searches performed by users of the computer system. The information stored for each search may include the search query, results, inaccessible results, relevance scores, user performing the search, or any other information related to the search. This information may be used to identify content which may be useful to multiple users of the computer system. For example, a target result may be identified if it was an inaccessible result in a specified number of searches. In another example, a target result may be identified if a specified number of users executed searches that produced the inaccessible result. Relevance value may also be used with respect to identifying target results using previous search data. For example, a target result may be identified if the search data indicates that a result was produced in a specified number of searches with at least a minimum relevance. A time period may also be used in identifying target results. For example, a target result may be identified if the inaccessible result was produced in a specified number of searches within a specified time period, such as the previous week.

For each identified target result, an owner with permission to modify the access control of the target result may be identified. In some instances, there may be one owner with permission to modify access control to the target content. In other instances there may be several owners with access control. In some embodiments, a social network is used to identify an owner with access control. For example, the owners with access control may be determined and compared to people associated with the user that performed the search in a social network. If an owner is associated with the user in a social network, the owner may be notified. In some embodiments, the owners of content are not notified unless the user is associated with the owner in a social network. Owners associated with the user in a social network may be more likely to grant access to the user.

An owner may be notified about the target content in a number of ways, such as an email or a user interface. The notification may contain different details regarding the search or searches which produced the target result. The notification may include information regarding the users performing the search, search queries used, and relevance values of the result for the search. The level of detail in the notification may be different based on the desired level of privacy for the users of the computer system. For example, the notification may indicate the target result is not accessible to a user having performed a search, but does not identify the user. This may protect the privacy of the user performing the search. In another example, the notification may include information about the user which could be helpful in deciding whether to grant access such as the user's position or department within an organization. In some embodiments, disclosing the identity of the user performing the search may only occur when the owner is associated with the user in a social network. However, in other embodiments the user's identity may always be disclosed.

In embodiments where previous search data is used to determine the target result, the notification may include statistics regarding the target result. For example, the notification may state the number of users having performed a search which produced the target result whether or not they had access to the target result. The notification may also indicate the number of users performing a search that produced the target result which did not have access to the target result. The notification may identify users which the owner is associated with on a social network.

In response to the notification, the owner may take several steps. The owner may review the access settings on the target result to determine if it is properly protected. The owner may provide access to the target result to specific users or may notify the users that the target result exists. If the access control on the content allows for giving limited access to users, the owner may allow temporary access for specific users such as a limited time period or a limited number of times to access the target result. The owner may modify the access control to allow access to all users if the owner determines that the content does not need protection. Alternatively, the owner may decide the content is properly protected and may do nothing in response to the notification.

Embodiments which notify the user via user interface may provide for the owner to modify the access control on the target result through the user interface. The user may be able to modify the access control to provide permanent or limited access to all users or specific users. The user interface may allow the owner to notify the users, through email or other method, that the owner has access control to content which may be useful to the users, without providing access. This may inform the users that the content exists and allow them to contact the owner to discuss obtaining access.

Referring to FIG. 1, a flow diagram of an example method 100 for identifying content under access control in a computer system is depicted. At block 110, a search query may be received from a user at a computing device connected to the computer system. The search query may include search terms and any other search criteria. At block 120, results may be determined using a search engine to search content on the computer system. The search engine may perform one or more searches to produce results which include results which are inaccessible to the user due to access control on the result. At block 130, a list of results may be provided to the user which does not include results which are inaccessible to the user. At block 140, one or more target results are identified from the results which are not accessible to the user. As described above, selecting target results may involve relevance values and previous search data for the computer system. At block 150, owners with permission to modify the access control on the one or more target results are identified. Identifying owners may involve finding an owner associated with the user in a social network as described above. At block 160, the owners may be notified regarding their respective target results. This may include providing a user interface to each owner with information regarding the target result associated with the owner. The user interface may also allow for the owner to modify the access control on the target result, or otherwise provide access to the content to the user.

Figure 2:
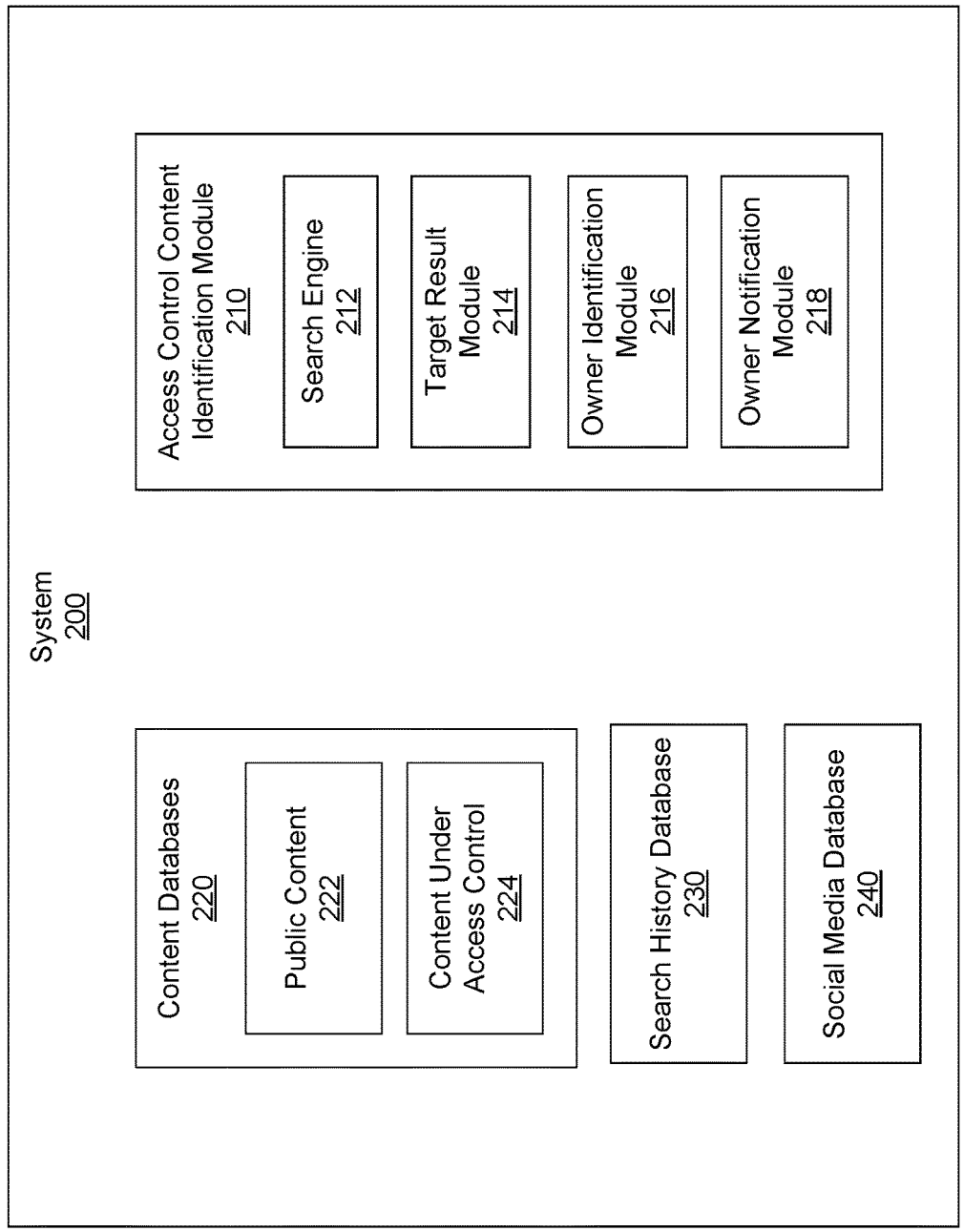
FIG. 2 depicts an example system for identifying content under access control.

Referring to FIG. 2, an example system 200 for identifying content under access control is depicted. System 200 may include access control content identification module 210, content databases 220, search history database 230, and social media database 240. Access control content identification module 210 may include search engine 212, target result module 214, owner identification module 216, and owner notification module 218. Content databases 220 may contain public content 222 and content under access control 224.

Search engine 212 may be configured to search content databases 220 using a search query entered by a user of system 200. In some embodiments, search engine 212 may maintain one or more indexes representative of the content in content databases 220 and search engine 212 may use the indexes to execute searches. In some embodiments, search engine 212 may be configured to execute a first search on content accessible to the first user and a second search on content inaccessible to the first user due to access control on the content. In some embodiments, search engine 212 is configured to perform a single search on content which includes both accessible and inaccessible content. Search engine 212 may be configured to provide the user with results that the user has access to. Search engine 212 may further be configured to identify results inaccessible to the user, but not provide them to the user. Search engine 212 may be configured to calculate a relevance value for each of the results. Search engine 212 may further be configured to store search data in search history database 230.

Target result module 214 may be configured to identify target results from the inaccessible results identified by search engine 212. Target result module 214 may be configured to access information from search history database 230 for identifying target results.

Owner identification module 216 may be configured to identify owners with permission to modify access control on the identified target results. Owner identification module 216 may be configured to access social media database 240 to identify owners associated with the user on a social network. Although social media database 240 is depicted within system 200, it may be accessed through a network connected to system 200.

Owner notification module 218 may be configured to notify owners identified by owner identification module 216. The notification may occur through email, user interface, or any other electronic method. The notification may contain different details regarding the target result as described herein.

Figure 3:
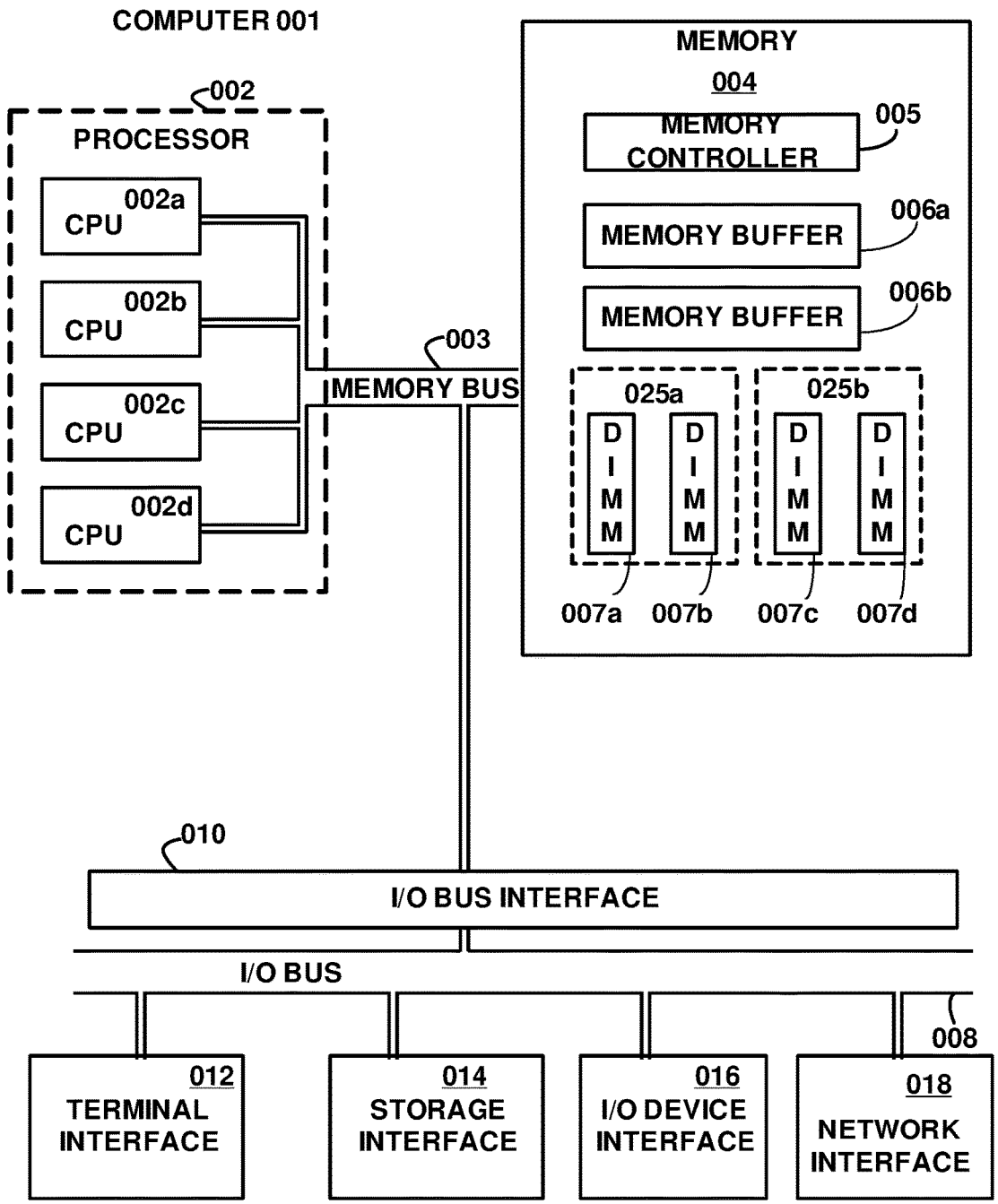
FIG. 3 depicts a high-level block diagram of an example system for implementing one or more embodiments of the invention.

Referring to FIG. 3, a high-level block diagram of an example system for implementing one or more embodiments of the invention is depicted. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffer 006 and one or more memory devices 007. In the illustrated embodiment, the memory devices 007 may be dual in-line memory modules (DIMMs), which are a series of dynamic random-access memory (DRAM) chips mounted on a printed circuit board and designed for use in personal computers, workstations, and servers. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 3 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 3 is intended to depict the representative major components of an exemplary computer system 001. But individual components may have greater complexity than represented in FIG. 3, components other than or in addition to those shown in FIG. 3 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for identifying content under access control, the system comprising:
   one or more computer processors; and
   a memory containing program instructions, the program instructions executable by the one or more processors to cause the one or more processors to perform a method comprising:
      receiving, from a computing device connected to a computer system, a search query from a first user;
      performing, based on the search query, a search on the computer system using a superuser account with access to all content stored on the computer system, the content including documents, spreadsheets, images, and video;
      identifying a set of results from the content stored on the computer system based on the search, the set of results including a first subset of results, the first subset of results not accessible to the first user due to access control;
      providing a list of results from the set of results to the first user, the list excluding the first subset of results, the first subset of results not provided to the first user;
      identifying, without input from the first user, a target result from the first subset of results based on the target result being produced as an inaccessible result in a specified number of searches with at least a minimum relevance value and within a specified period of time;
      identifying an owner with permission to modify access control for the target result;
      determining the owner is associated with the user in a social network; and
      providing, in response to the determining the owner is associated with the user in the social network, a notification to the owner through a user interface, the notification indicating that the target result is not accessible to the first user, the notification including information about the first user, the notification further including search statistics regarding the target result, the search statistics including a number of users that have performed a search that produced the target result and did not have access to the target result, the user interface allowing the owner to modify the access control for the target result, the user interface further allowing the owner to notify the first user that the owner has permission to modify the access control for the target result.

* * * * *